(12) United States Patent
Ke et al.

(10) Patent No.: US 7,781,381 B2
(45) Date of Patent: Aug. 24, 2010

(54) METHOD FOR CONTROLLING INORGANIC FLUORIDE SCALES

(75) Inventors: Mingjie Ke, Spring, TX (US); Qi Qu, Spring, TX (US)

(73) Assignee: BJ Services Company LLC, Houston, TX (US)

( * ) Notice: Subject to any disclaimer, the term of this patent is extended or adjusted under 35 U.S.C. 154(b) by 436 days.

(21) Appl. No.: 11/901,578

(22) Filed: Sep. 18, 2007

(65) Prior Publication Data

US 2009/0075844 A1 Mar. 19, 2009

(51) Int. Cl.
*C09K 8/528* (2006.01)
*C09K 8/52* (2006.01)
*E21B 43/25* (2006.01)

(52) U.S. Cl. .......................... 507/237; 507/90; 166/307

(58) Field of Classification Search ................. 507/237, 507/90; 166/307
See application file for complete search history.

(56) References Cited

U.S. PATENT DOCUMENTS

| 2,663,689 | A | 12/1953 | Kingston et al. |
| 2,961,355 | A | 11/1960 | Beale, Jr. et al. |
| 4,330,419 | A | 5/1982 | Hall et al. |
| 5,529,125 | A | 6/1996 | Di Lullo Arias et al. |
| 6,443,230 | B1 | 9/2002 | Boles et al. |
| 7,270,180 | B2 | 9/2007 | Ke et al. |
| 2005/0016731 | A1 | 1/2005 | Rae et al. |
| 2006/0124301 | A1 | 6/2006 | Gupta et al. |
| 2006/0124302 | A1 | 6/2006 | Gupta et al. |

FOREIGN PATENT DOCUMENTS

| WO | 03029613 A1 | 4/2003 |
| WO | 2007116366 A2 | 10/2007 |

OTHER PUBLICATIONS

Rae, Phil and Gino Di Lullo; "Single Step Matrix Acidising With HF-Eliminating Preflushes Simplifies the Process, Improves the Results"; SPE 107296; 2007.

*Primary Examiner*—Timothy J. Kugel
*Assistant Examiner*—Aiqun Li
(74) *Attorney, Agent, or Firm*—Jones & Smith, LLP; John Wilson Jones

(57) ABSTRACT

The productivity of hydrocarbons from hydrocarbon-bearing calcareous or siliceous formations is enhanced by contacting the formation with a well treatment composition which contains a hydrofluoric acid source, a boron containing compound and a phosphonate acid, ester or salt thereof.

30 Claims, No Drawings

METHOD FOR CONTROLLING INORGANIC FLUORIDE SCALES

FIELD OF THE INVENTION

The invention relates to a method of stimulating or remediating siliceous and calcareous formations by use of a well treatment composition which contains a boron containing compound, a phosphonate acid, ester or salt and a hydrofluoric acid source.

BACKGROUND OF THE INVENTION

In the course of drilling, or during production or workover, the vast majority of oil and gas wells are exposed to conditions that ultimately lead to formation damage. Formation damage limits the productive (or injective) capacity of the well. The reduction in well performance is generally due to changes in near-wellbore permeability which may be caused by a number of factors, such as rock crushing, invasion of drill solids, swelling of pore-lining clays, migration of mobile fines and changes in wettability.

It is known that permeability impairment may be improved by injecting acid formulations containing HF into the formation. Such methods are known to improve production from both subterranean calcareous and siliceous formations.

Most sandstone formation are composed of over 70% sand quartz, i.e. silica, bonded together by various amount of cementing material including carbonate, dolomite and silicates. Suitable silicates include clays and feldspars. A common method of treating sandstone formations involves introducing hydrofluoric acid into the wellbore and allowing the hydrofluoric acid to react with the surrounding formation. Hydrofluoric acid exhibits high reactivity towards siliceous minerals, such as clays and quartz fines. For instance, hydrofluoric acid reacts very quickly with authigenic clays, such as smectite, kaolinite, illite and chlorite, especially at temperatures above 150° F. As such, hydrofluoric acid is capable of attacking and dissolving siliceous minerals.

Upon contact of hydrofluoric acid with metallic ions present in the formation, such as sodium, potassium, calcium and magnesium, undesirable precipitation reactions occur. For example, during the treatment of calcareous or siliceous formations containing carbonate or dolomite, calcium or magnesium fluoride scales often form as a result of precipitation. Such scales tend to plug the pore spaces and reduce the porosity and permeability of the formation.

Alternative methods of treating calcareous or siliceous formations with hydrofluoric acid have been sought wherein the formation of undesirable scales is prevented or inhibited.

SUMMARY OF THE INVENTION

Subterranean sandstone or siliceous formations and calcareous formations penetrated by oil, gas or geothermal wells may be treated with an aqueous well treatment composition containing a hydrofluoric acid source in combination with a boron containing compound and a phosphonate acid, ester or salt. Such compositions have been shown to increase the permeability of the formation being treated by inhibiting or preventing the formation of undesirable inorganic scales, such as calcium fluoride, magnesium fluoride, potassium fluorosilicate, sodium fluorosilicate, fluoroaluminate, etc. As a result, production from the formation is increased or improved.

The boron containing compound for use in the composition defined herein is preferably fluoroboric acid or a boron compound which is capable of being hydrolyzed to form a $BF_4^-$ complex when exposed to $F^-$ or a hydrofluoric acid source.

While the hydrofluoric acid source may be hydrofluoric acid, it more typically is prepared in-situ in the aqueous system by the reaction of hydrochloric acid and ammonium bifluoride or ammonium fluoride. In the current invention, an excess of ammonium bifluoride or ammonium fluoride is used such that all of the hydrochloric acid is consumed in the production of hydrofluoric acid, leaving a small amount of unconverted ammonium bifluoride or ammonium fluoride.

The phosphonate of the well treatment composition is preferably a phosphonate acid, ester or salt thereof, such as those of the formula:

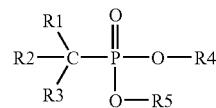

wherein R1, R2 and R3 are independently selected from hydrogen, alkyl, aryl, phosphonic, phosphonate, phosphate, aminophosphonic, aminophosphonate, acyl, amine, hydroxy and carboxyl groups and salts thereof and R4 and R5 are independently selected from hydrogen, sodium, potassium, ammonium or an organic radical.

The pH of the composition is typically maintained at a range of 0.5 to 2.5. This aids in the inhibition of inorganic scales and in most instances the prevention of formation of the undesirable scales. Additionally, it will minimize corrosion potential on downhole metal tubulars

DETAILED DESCRIPTION OF THE PREFERRED EMBODIMENTS

Inorganic fluoride scales, formed during well treatments with hydrofluoric acid, may be controlled by treating the subterranean formation penetrated by the well with an aqueous well treatment composition which contains a hydrofluoric acid source, a boron containing compound and a phosphonate compound. The boron containing compound principally functions to inhibit or prevent the formation of fluoride scales or to remove such scales from wellbores, screens or other equipment and/or pipelines. The phosphonate compound principally functions as a stabilizer.

In a preferred embodiment, the boron containing compound is fluoroboric acid or tetrafluoroboric acid of the formula $BF_4^-H^+$.

The boron containing compound may further be an acid soluble boric acid and/or an organic boron containing compound, including those which are capable of forming a $BF^-$ complex when hydrolyzed and exposed to $F^-$ or HF containing solution. The reaction, where the boron containing compound is boric acid, may be represented by the equation:

$$4HF + H_3BO_3 \rightarrow BF_4^- + H_3O^+ + 2H_2O \qquad (I).$$

The formation of $BF_4^-$ controls the concentration of active HF at any given time. Borate esters further acid hydrolyze to boric acid which tender the $BF_4^-$ complex, as set forth by equation (I) above. Hydrolysis may not occur, however, until higher than ambient temperatures are reached. For instance, hydrolysis may not occur until formation temperature is reached or sufficient heat is generated from the acid reaction.

Suitable boron containing compounds include boric acid, $H_3BO_3$ as well as esters of boric acid. Preferred as the boron containing compounds are those of the formula $R_6R_7R_8BO_3$ wherein each of $R_6$, $R_7$ and $R_8$ are independently hydrogen or a unsubstituted or substituted alkyl or alkylene group, and is preferably independently selected from hydrogen or $C_1$-$C_4$ alkyl group, optionally substituted with one or more —OH groups. Preferred boron compounds include tributyl borate which is very moisture sensitive.

Also preferred are tetraborates, such as sodium tetraborate. Boric oxide, $B_2O_3$, metaboric acid and $HBO_2$ are further preferred since they easily hydrolyze to boric acid, $B(OH)_3$.

Boric acid reacts rapidly with polyols, glycerol α-hydroxycarboxylic acids, cis-1,2-diols, cis-1,3-diosl, o-quinols, o-catechol and mannitol to form ether type complexes. For instance, three molecules of water are generated with mannitol and the last proton, $H^+$, is associated with the molecule which can be quantitatively titrated with NaOH. In the presence of HF, such compounds would readily form the $BF_4^-$ complex.

Further preferred boron containing compounds are cyclic borate esters, such as those of the formula:

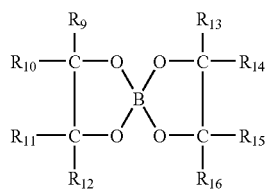

(II)

wherein each of $R_9$, $R_{10}$, $R_{11}$, $R_{12}$, $R_{13}$, $R_{14}$, $R_{15}$ and $R_{16}$ is independently selected from hydrogen or a substituted or unsubstituted alkyl or alkenyl group, and is preferably independently selected from hydrogen or a $C_1$-$C_4$ alkyl group, optionally substituted with one or more —OH groups or $OR_{13}$ (which can readily cleave to form the desired $BF_4^-$ complex), wherein $R_{13}$ is a $C_1$-$C_9$ alkyl or aryl group. Suitable esters include those formed with salicyclic acid or acetic acid. Other cyclic borates include $CH_3B_3O_3$ which hydrolyze rapidly in water.

The presence of $BF_4^-$ controls the concentration of active HF at any given time. As a result, the formation of calcium and magnesium fluoride, sodium or potassium fluorosilicate, or fluoroaluminate scales is prevented or inhibited.

Typically, the amount of boron containing compound in the well treating composition is that sufficient to impart to the composition between from about 0.5 to about 10 g of $BF_4^-$ complex per 100 cc of phosphonate, hydrofluoric acid source and water.

The hydrofluoric acid source, useful in the formation of the $BF_4^-$ complex may be hydrofluoric acid. More typically, however, the hydrofluoric acid source is the combination of a mineral acid and ammonium bifluoride or ammonium fluoride. Reaction of the acid with the ammonium bifluoride or ammonium fluoride renders HF. The use of the combination of acid and ammonium bifluoride or ammonium fluoride and boric acid to control hydrogen fluoride significantly slows the hydrofluoric acid reaction rate.

Preferred as the acid is hydrochloric acid, though other acids such as citric, chloroacetic, methanesulfonic, sulfuric, sulfamic, nitric, acetic, lactic, fumaric and formic acid may also be used. Preferred organic acids include citric acid, acetic acid and formic acid. A retarder may also be used, such as an aluminum salt.

In the reaction, ammonium bifluoride or ammonium fluoride hydrolyzes and is converted to hydrofluoric acid. When ammonium bifluoride or ammonium fluoride is used as a source of hydrofluoric acid, typically less acid is present than is necessary to hydrolyze all of the ammonium bifluoride or ammonium fluoride. Thus, there remains some unconverted ammonium bifluoride or ammonium fluoride in the composition.

The hydrofluoric acid source of the aqueous well treatment composition generally provides between from about 0.25 to about 10, typically between from about 1.0 to about 6.0, weight percent of hydrofluoric acid to the well treatment composition (based on the total weight of the well treatment composition).

When present, the well treatment composition may further contain between from about 1 to about 50 weight percent of organic acid, preferably about 10 weight percent based on the total weight of the well treatment composition.

The phosphonate compound may be a polyphosphonic acid and their salts and esters and is preferably a phosphonate acid, salt or ester thereof. Preferred are phosphonate materials of the formula:

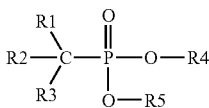

(III)

wherein R1, R2 and R3 are independently selected from hydrogen, alkyl, aryl, phosphonic, phosphonate, phosphate, aminophosphonic, aminophosphonate, acyl, amine, hydroxy and carboxyl groups and salts thereof and R4 and R5 are independently selected from hydrogen, sodium, potassium, ammonium or an organic radical. Preferred organic radicals are $C_nH_{2n+1}$ wherein n is between from 1 to about 5.

Preferred as R1, R2 and R3 are aminophosphonate and aminophosphonic groups which may optionally be substituted with alkyl, phosphonic, aminophosphonic, phosphate and phosphonate groups.

Examples of preferred phosphonate acids, esters or salts include aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt. Among the commercial phosphonate materials, preferred is 1-hydroxyethylidene-1,1-diphosphonic acid, available as DEQUEST 2010 and diethylenediamine penta (methylene phosphonic) acid, commercially as DEQUEST 2060S, both available from Solutia, Inc. in 60% strength.

In general, the phosphonic acids are more preferred over the salt derivatives. Thus, in formula (III) above, both R4 and R5 are more desirably —H versus the stated salt derivatives. Also preferred are those phosphonic acid salts which generate the corresponding phosphonic acid in-situ in the presence of a slight amount of strong acid, such as HCl.

The amount of phosphonate in the well treatment composition is generally between from about 0.1 to about 10, preferably from about 0.25 to about 6, more preferably from about 0.5 to about 3, percent by volume based on the total volume of water, phosphonate and hydrofluoric acid source.

The well treatment composition has a pH greater than or equal to 0.5 and thus is much less corrosive than the acid systems of the prior art including those disclosed in U.S. Pat. Nos. 2,663,689; 2,961,355; and 4,330,419. Enough acid should be used to maintain the pH of the aqueous HF solution and to hydrolyze ammonium fluoride or bifluoride, if it is used. The pH of the composition is typically maintained at a range of 0.5 to 2.5. Maintenance of the desired pH range aids in the inhibition of inorganic scales and in most instances the prevention of formation of such scales.

Other materials commonly added to acid treatment solutions may also optionally be added to the well treatment composition herein. For example, the composition may include or have added thereto corrosion inhibitors, surfactants, iron control agents, non-emulsifiers, foaming agents, water-wetting surfactants, anti-sludge agents, mutual solvents or alcohols (such as methanol or isopropanol), gelling agents, bactericides, clay stabilizers or fluid loss control agents. The amount of such additives, when employed, is typically between from about 0.1 to about 2 weight percent. When mutual solvents or alcohols are employed, they are typically used in amounts between from about 1 to about 20 weight percent of the well treatment composition.

The well treatment composition is introduced into the formation at the location where treatment is desired. The well treatment composition may be applied after treatment of the formation with a pre-flush.

The well treatment composition of the invention enhances the production of hydrocarbons from hydrocarbon bearing calcareous or siliceous formations. The treatment method is especially effective if applied prior to gravel packing or fracturing.

The well treatment composition may easily be applied in the stimulation of sandstone formations containing calcareous materials and calcareous formations such as carbonate or dolomite. In addition to its use in matrix acidizing, it may be used in acid fracturing as well as pre-fracturing treatment on sandstone, carbonate and dolomite formations. They may also be used for remedial workovers of wells to keep silicates in suspension and to remove clay, fine and sand deposits as well as inorganic scales from downhole screens and from drilling fluid damage. The well treatment composition is capable of dissolving carbonates, as well as siliceous minerals, while minimizing the formation of calcium fluoride and magnesium fluoride or sodium or potassium fluorosilicate or fluoroaluminate.

Such well treatments may be simplified by use of the well treatment composition defined herein since the need to pump multiple fluids in a carefully choreographed sequence is eliminated. Further, acid placement and distribution is improved and equipment requirements are reduced, e.g., in terms of tankage, etc. Use of the well treatment composition improves logistics, reduces costs, along with improved results, while simultaneously rendering treatments which are easier to implement and control at the field level.

In addition to preventing and/or inhibiting the formation of inorganic scales in subterranean formation, the well treatment composition may further be employed in the remediation of oil and gas and geothermal wells by preventing and/or inhibiting the formation of unwanted deposits on the surfaces of the wellbore, downhole assembly, sand control screens, production equipment and pipelines. Such unwanted deposits form and/or accumulate in the wellbore, production equipment, recovery equipment and well casing. Such accumulated deposits affect productivity and are typically removed prior to cementing or the introduction of completion fluids into the wellbore. Remediation treatment fluids are further typically used to remove such undesired deposits prior to the introduction of stimulation fluids or to restore well productivity from the undesired deposits. In a preferred embodiment, the invention is used to remove siliceous or calcareous deposits inside well tubulars. The well treatment composition may also be used to treat pipelines from undesired deposits.

In well remediation applications, the well treatment composition is preferably injected directly into the wellbore through the production tubing or through the use of coiled tubing or similar delivery mechanisms. Once downhole, the composition remedies damage caused during well treating such as, for instance, by stimulation fluids and drilling fluid muds, by dispersing and removing siliceous materials from the formation and wellbore.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of volume percent except as may otherwise be indicated.

EXAMPLES

Examples 1-6

Analytical grade carbonate powder was exposed to an aqueous hydrofluoric acid solution at 70° F. The un-dissolved solid or precipitate was analyzed by X-ray diffraction technique (XRD). Table 1 presents the results of these tests wherein pH A represents the pH at the beginning of the testing and pH B represents the pH at the end of the testing.

TABLE 1

| Ex. No. | Composition | pH A | pH B | $CaCO_3$ added | Comments |
| --- | --- | --- | --- | --- | --- |
| Comp. Ex. 1 | HF acid | 2.2 | 2.2 | 0.4 g/100 cc | All carbonate dissolved and $CaF_2$ precipitate formed within 5 minutes. |
| Comp. Ex. 2 | HF acid 3% Dequest 2010 | 1.9 | 1.9 | 0.4 g/100 cc | All carbonate dissolved and $CaF_2$ precipitate formed within 5 minutes. |
| Comp. Ex. 3 | HF acid 2.8 g/100 cc Boric acid | 2.2 | >4.0 | 0.4 g/100 cc | All carbonate dissolved and $CaF_2$ precipitate formed within 5 minutes. |

TABLE 1-continued

| Ex. No. | Composition | pH A | pH B | CaCO₃ added | Comments |
|---|---|---|---|---|---|
| 4 | HF acid<br>3% Dequest 2010<br>2.8 g/100 cc Boric acid | 1.6 | 1.6 | 0.4 g/100 cc | All carbonate dissolved and no precipitate formed over 4 hours. |
| 5 | HF acid<br>3% Dequest 2060S<br>4.2 g/100 cc Boric acid | 1.6 | 1.6 | 1.0 g/100 cc | All carbonate dissolved and no precipitate formed over 24 hours. |
| 6 | HF acid<br>1.5% Dequest 2010<br>1.5% Dequest 2060S<br>4.2 g/100 cc Boric acid | 1.6 | 1.6 | 1.0 g/100 cc | All carbonate dissolved and no precipitate formed over 24 hours. |

Example 7

The dissolution effect of the compositions of Examples 1-6 was illustrated on a formation containing calcareous minerals as follows. A composition consisting of 75 wt. % quartz, 5 wt. % kaolinite, 10 wt. % potassium-feldspar and 10 wt. % calcium carbonate (powder) was prepared. The composition was tested for its solubility in a HF acid at 150° F. over 4 and 24 hrs. After solubility testing, the un-dissolved solid or precipitate was analyzed. The experimental conditions and results are set forth in Tables 2-5. Table 2 represents the 4 hour solubility testing of the formation composition at 150° F. Tables 3-5 represent the 4 and 24 hour solubility testing of the formation composition at 150° F.

TABLE 2

| Acid | HF acid<br>3% Dequest<br>2010 | HF acid<br>2.8 g/100 cc<br>Boric acid | HF acid<br>3% Dequest<br>2010<br>2.8 g/100 cc<br>Boric acid | HF acid<br>3% Dequest<br>2060S | HF acid<br>3% Dequest<br>2060S<br>2.8 g/100 cc Boric acid |
|---|---|---|---|---|---|
| pH before/after | 1.9/1.9 | 2.2/5.5 | 1.6/1.9 | 1.6/1.6 | 1.0/1.3 |
| Solubility, % | 14.9 | 4.4 | 14.4 | 14.7 | 9.6 |
| Quartz | 87 | 79 | 91 | 89 | 88 |
| Plagioclase | nd | 1 | 1 | nd | 1 |
| K-feldspar | 4 | 7 | 6 | 2 | 6 |
| Kaolinite | nd | 2 | nd | nd | 2 |
| Calcite | 1 | 1 | 1 | tr | 1 |
| $CaF_2$ | 7 | 9 | <0.5 | 8 | 1 |
| $K_2SiF_6$ | tr | nd | nd | nd | nd |

Notes:
nd—not detected and
tr—trace.

TABLE 3

| | Acid | | | |
|---|---|---|---|---|
| | HF acid<br>7.5% Dequest 2010<br>22.5% Dequest 2060S | | HF acid<br>7.5% Dequest 2010<br>22.5% Dequest 2060S<br>2.8 g/100 cc Boric acid | |
| Time, Hrs | 4 | 24 | 4 | 24 |
| pH before/after | 1.6/1.6 | 1.6/1.6 | 1.3/1.6 | 1.3/1.6 |
| Solubility, % | 13.4 | 20.8 | 11.9 | 12.2 |
| Quartz | 89 | 91 | 90 | 91 |
| Plagioclase | nd | nd | 1 | 1 |
| K-feldspar | 3 | nd | 6 | 6 |
| Kaolinite | nd | nd | 1 | nd |
| Calcite | tr | nd | 1 | 1 |
| $CaF_2$ | 7 | 8 | nd | nd |
| $K_2SiF_6$ | tr | tr | nd | nd |

Notes:
nd—not detected and
tr—trace.

TABLE 4

| | Acid | | | |
|---|---|---|---|---|
| | HF acid 1.5% Dequest 2010 1.5% Dequest 2060S | | HF acid 1.5% Dequest 2010 1.5% Dequest 2060S 2.8 g/100 cc Boric acid | |
| Time, Hrs | 4 | 24 | 4 | 24 |
| pH before/after | 1.9/1.6 | 1.9/1.6 | 1.3/1.6 | 1.3/1.6 |
| Solubility, % | 13.8 | 24.6 | 12.0 | 15.4 |
| Quartz | 90 | 90 | 90 | 92 |
| Plagioclase | nd | nd | 1 | tr |
| K-feldspar | 2 | nd | 6 | 6 |
| Kaolinite | nd | nd | 1 | nd |
| Calcite | tr | nd | tr | tr |
| $CaF_2$ | 7 | 9 | 1 | 1 |
| $K_2SiF_6$ | tr | tr | nd | nd |

Notes:
nd—not detected and
tr—trace.

TABLE 5

| | Acid | | | |
|---|---|---|---|---|
| | HF acid 22.5% Dequest 2010 7.5% Dequest 2060S | | 3% HF 22.5% Dequest 2010 7.5% Dequest 2060S 2.8 g/100 cc Boric acid | |
| Time, Hrs | 4 | 24 | 4 | 24 |
| pH before/after | 1.6/1.6 | 1.6/1.6 | 1.3/1.6 | 1.3/1.6 |
| Solubility, % | 13.9 | 22.8 | 12.1 | 15.3 |
| Quartz | 89 | 89 | 90 | 90 |
| Plagioclase | nd | nd | 1 | 1 |
| K-feldspar | 2 | tr | 5 | 5 |
| Kaolinite | nd | nd | tr | nd |
| Calcite | tr | nd | 1 | 1 |
| $CaF_2$ | 8 | 10 | 2 | 2 |
| $K_2SiF_6$ | tr | tr | nd | nd |

Notes:
nd—not detected and
tr—trace.

Tables 2-5 demonstrate that the well treatment compositions defined herein can control or minimize the formation of inorganic fluoride scales, such as calcium fluoride, in the hydrofluoric acid.

From the foregoing, it will be observed that numerous variations and modifications may be effected without departing from the true spirit and scope of the novel concepts of the invention.

What is claimed is:

1. A method for enhancing the productivity of a hydrocarbon-bearing calcareous or siliceous formation which comprises:

(A) introducing into a wellbore penetrating the formation an aqueous well treating composition comprising:

(a) a boron containing compound selected from the group consisting of (i.) fluoroboric acid and (ii.) boron compounds capable of forming a $BF_4^-$ complex when exposed to $F_4^-$ or a hydrofluoric acid source;

(b) a phosphonate acid, ester or salt thereof, wherein the phosphonate is of the formula:

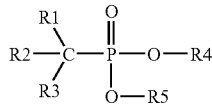

wherein R1, R2 and R3 are independently selected from hydrogen, alkyl, aryl, phosphonic, phosphonate, phosphate, aminophosphonic acid, aminophosphonate, acyl, amine, hydroxy and carboxyl groups and R4 and R5 are independently selected from hydrogen, sodium, potassium, ammonium or an organic radical; and (c) a hydrofluoric acid source; and (B) preventing and/or inhibiting the formation of inorganic fluoride scales in the wellbore and/or formation by forming a $BF_4^-$ complex and thereby enhancing the productivity of the formation wherein the combination of boron containing compound and the phosphonate acid, ester or salt creates a synergistic effect such that the amount of inorganic fluoride scales precipitated in the presence of the combination is less than the amount of inorganic fluoride scales precipitated when either the boron containing compound or phosphonate acid, ester or salt is used alone.

2. The method of claim 1, wherein the aqueous well treating composition prevents and/or inhibits the formation of scales of at least one inorganic fluoride selected from the group consisting of calcium fluoride, magnesium fluoride, sodium fluorosilicate, potassium fluorosilicate and fluoroaluminate.

3. The method of claim 1, wherein the phosphonate acid, ester or salt thereof is selected from the group consisting of aminotri (methylene phosphonic acid) and its esters and pentasodium salt, 1-hydroxyethylidene-1,1-diphosphonic acid and its esters and tetrasodium salt, hexamethylenediaminetetra (methylene phosphonic acid) and its esters and hexapotassium salt, and diethylenetriaminepenta (methylene phosphonic acid) and its esters and sodium salt.

4. The method of claim 3, wherein the phosphonate acid, ester or salt thereof is selected from the group consisting of aminotri (methylene phosphonic acid), 1-hydroxyethylidene-1,1-diphosphonic acid, hexamethylenediaminetetra (methylene phosphonic acid), diethylenetriaminepenta (methylene phosphonic acid) and diethylenediamine penta (methylene phosphonic) acid.

5. The method of claim 3, wherein the phosphonate acid, acid, ester or salt thereof is selected from the group consisting of 1-hydroxyethylidene-1,1-diphosphonic acid and diethylenediamine penta (methylene phosphonic) acid.

6. The method of claim 1, wherein the boron containing compound is a boron compound capable of forming a $BF_4^-$ complex when exposed to a hydrofluoric acid source.

7. The method of claim 6, wherein the hydrofluoric acid source provides between from about 0.25 to about 10 weight percent of HF to the aqueous well treatment composition.

8. The method of claim 1, wherein the pH of the aqueous well treating composition is between from about 0.5 to about 2.5.

9. The method of claim 1, wherein the formation contains dolomite.

10. A method of increasing the permeability of a hydrocarbon-bearing calcareous or siliceous formation which comprises (A) introducing into a wellbore penetrating the calcareous or siliceous formation an aqueous well treating composition comprising:
   (a) a boron containing compound selected from the group consisting of (i.) fluoroboric acid and/or (ii.) boron compounds capable of forming a $BF_4^-$ complex when exposed to $F_4^-$ or a hydrofluoric acid source;
   (b) a phosphonate acid, ester or salt thereof, wherein the phosphonate is of the formula:

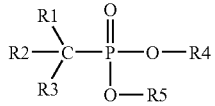

wherein R1, R2 and R3 are independently selected from hydrogen, alkyl, aryl, phosphonic, phosphonate, phosphate, aminophosphonic acid, aminophosphonate, acyl, amine, hydroxy and carboxyl groups and R4 and R5 are independently selected from hydrogen, sodium, potassium, ammonium or an organic radical; and
   (c) a hydrofluoric acid source; and
(B) preventing and/or inhibiting the formation of inorganic fluoride scales upon formation of $BF_4^-$ in the calcareous or siliceous formation and/or wellbore and thereby increasing the permeability of the calcareous or siliceous formation
wherein the combination of boron containing compound and the phosphonate acid, ester or salt thereof creates a synergistic effect such that the amount of inorganic fluoride scales precipitated in the presence of the combination is less than the amount of inorganic fluoride scales precipitated when either the boron containing compound or phosphonate acid, ester or salt is used alone.

11. The method of claim 10, wherein the aqueous well treating composition prevents and/or inhibits the formation of scales of at least one inorganic fluoride selected from the group consisting of calcium fluoride, magnesium fluoride, sodium fluorosilicate, potassium fluorosilicate and fluoroaluminate.

12. The method of claim 10, wherein the phosphonate acid, ester or salt thereof is selected from the group consisting of aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt.

13. The method of claim 10, wherein the boron containing compound is a boron compound capable of forming a $BF_4^-$ complex when exposed to a hydrofluoric acid source.

14. The method of claim 13, wherein the hydrofluoric acid source provides between from about 0.25 to about 10 weight percent of hydrofluoric acid to the aqueous well treating composition.

15. The method of claim 10, wherein the pH of the aqueous well treating composition is between from about 0.5 to about 2.5.

16. A method of preventing and/or inhibiting the formation of calcium fluoride and/or magnesium fluoride scales in a hydrocarbon-bearing calcareous or siliceous formation which comprises:

(A) introducing into the formation a well treatment composition comprising:
   (a) a boron containing compound selected from the group consisting of (i.) fluoroboric acid and/or (ii.) boron compounds capable of forming a $BF_4^-$ complex when exposed to $F_4^-$ or a hydrofluoric acid source;
   (b) a phosphonate acid, ester or salt thereof, wherein the phosphonate is of the formula:

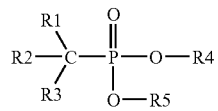

wherein R1, R2 and R3 are independently selected from hydrogen, alkyl, aryl, phosphonic, phosphonate, phosphate, aminophosphonic acid, aminophosphonate, acyl, amine, hydroxy and carboxyl groups and R4 and R5 are independently selected from hydrogen, sodium, potassium, ammonium or an organic radical; and
   (c) a hydrofluoric acid source; and
(B) forming a $BF_4^-$ complex and thereby preventing and/or inhibiting the formation of inorganic fluoride scales in the wellbore and/or formation
wherein the combination of boron containing compound and the phosphonate acid, ester or salt thereof creates a synergistic effect such that the amount of inorganic fluoride scales precipitated in the presence of the combination is less than the amount of inorganic fluoride scales precipitated when either the boron containing compound or phosphonate acid, ester or salt is used alone.

17. The method of claim 1, wherein the amount of phosphonate acid, ester or salt thereof in the aqueous well treating composition is between from about 0.1 to about 10 percent by volume based on the total volume of (b) and (c) and water.

18. The method of claim 1, wherein the boron containing compound is of the formula $R_6R_7R_8BO_3$ wherein each of $R_6$, $R_7$ and $R_8$ are independently hydrogen or a unsubstituted or substituted alkyl or alkylene group.

19. The method of claim 18, wherein each of $R_6$, $R_7$ and $R_8$ is independently selected from hydrogen or $C_1$-$C_4$ alkyl group, optionally substituted with one or more —OH groups.

20. The method of claim 1, wherein the boron containing compound is of the formula:

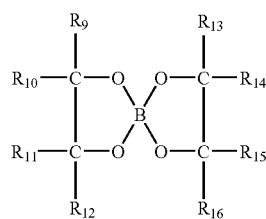

wherein each of $R_9$, $R_{10}$, $R_{11}$, $R_{12}$, $R_{13}$, $R_{14}$, $R_{15}$ and $R_{16}$ is independently selected from hydrogen or a substituted or unsubstituted alkyl or alkenyl group.

21. The method of claim 20, wherein each of $R_9$, $R_{10}$, $R_{11}$, $R_{12}$, $R_{13}$, $R_{14}$, $R_{15}$ and $R_{16}$ is independently selected from hydrogen or a $C_1$-$C_4$ alkyl group, optionally substituted with one or more —OH groups.

22. The method of claim 1, wherein boron containing compound is boric acid or a salt thereof.

23. The method of claim 1, wherein the amount of boron containing compound in the aqueous well treating composition is that sufficient to render between from about 0.5 to about 10 g $BF_4^-$ complex per 100 cc of (b), (c) and water.

24. The method of claim 1, wherein the aqueous well treating composition further comprises at least one member selected from the group consisting of corrosion inhibitors, mutual solvents, alcohols, iron control agents, non-emulsifiers, clay stabilizers and water-wetting surfactants.

25. The method of claim 1, wherein the aqueous well treatment composition is introduced into the wellbore during a fracturing operation.

26. The method of claim 1, wherein the aqueous well treatment composition is introduced into the wellbore during a remedial workover operation.

27. The method of claim 1, wherein the aqueous well treatment composition is introduced into the wellbore during a matrix acidizing operation.

28. The method of claim 10, wherein the amount of phosphonate acid, ester or salt thereof in the aqueous well treating composition is between from about 0.1 to about 10 percent by volume based on the total volume of (b) and (c) and water.

29. The method of claim 16, wherein the well treating composition further comprises at least one member selected from the group consisting of corrosion inhibitors, mutual solvents, alcohols, iron control agents, non-emulsifiers, clay stabilizers and water-wetting surfactants.

30. The method of claim 16, wherein the pH of the aqueous well treating composition is between from about 0.5 to about 2.5.

* * * * *